(12) United States Patent
Gerke et al.

(10) Patent No.: US 8,160,920 B2
(45) Date of Patent: Apr. 17, 2012

(54) SYSTEM AND METHOD OF MEASURING PROCESS COMPLIANCE

(75) Inventors: Kerstin Gerke, Froendenberg (DE); Jorge Cardoso, Funchal (PT); Alexander Claus, Dresden (DE)

(73) Assignee: SAP AG, Walldorf (DE)

( * ) Notice: Subject to any disclaimer, the term of this patent is extended or adjusted under 35 U.S.C. 154(b) by 447 days.

(21) Appl. No.: 12/541,470

(22) Filed: Aug. 14, 2009

(65) Prior Publication Data

US 2011/0040587 A1 Feb. 17, 2011

(51) Int. Cl.
*G06Q 10/00* (2012.01)
(52) U.S. Cl. ..................................... 705/7.36; 705/7.38
(58) Field of Classification Search ................. 705/7.36
See application file for complete search history.

(56) References Cited

U.S. PATENT DOCUMENTS

2006/0229926 A1* 10/2006 Homann et al. ................. 705/9

OTHER PUBLICATIONS

Dijkman, Remco. "A Classification of Differences between Similar Business Processes". 2007. IEEE.*
A.K. Alves de Medeiros, AJ.J.M.M. Weijters, and W.M.P. van der Aaist. "Genetic Process mining: A Basic Approach and its Challenges". In C. bussler and A. Haller, editors, BPM '05: Intl. Workshops on Business Process Management, vol. 3812 of LNCS, pp. 203{215, Nancy, France, 2006. Springer Berlin.
APQC, American Productivity & Quality Center. www.apqc.org/pcf, 2008.
T. Basten and W.M.P. van der Aaist. Inheritance of Behavior. Journal of Logic and Algebraic Programming, 47 (2):47{145, Mar./Apr. 2001.
L. Bergroth, H. Hakonen, and T. Raita. "A Survey of Longest Common Subsequence Algorithms." in SPIRE '00: 7th Intl. Symposium on String Processing Information Retrieval, p. 39, Washington, DC, USA, 2000. IEEE Computer Society.
P. Buchholz and P. Kemper. Hierarchical Reachability Graph Generation for Petri Nets. Form. Methods Syst. Des., 21(3):281{315, 2002.
J.E. Cook, C. He, and C. Ma. "Measuring Behavioral Correspondence to a Timed Concurrent Model". In ICSM '01: Intl. Conf. on Software Maintenance, p. 332, Washington, DC, USA, 2001. IEEE Computer Society.
R. Dijkman. "Diagnosing Differences Between Business Process Models." in BPM '08: Intl. Conf. on Business Process Management, pp. 261{277, Berlin, Heidelberg, 2008. Springer Berlin.
M. Ehrig, A. Koschmider, and A. Oberweis. Measuring Similarity between Semantic Business Process Models. In APCCM '07: Asia-Pacific Conf. on Conceptual Modeling, pp. 71{80, Darlinghurst, Australia, 2007.
K. Gerke and G. Tamm. "Continuous Quality Improvement of IT Processes based on Reference Models and Process Mining". In AMCIS '09: Americas Conf. on Information Systems, San Francisco, California, USA, Aug. 2009.
Y.C. Juan. "A String Comparison Approach to Process Logic Differences between Process Models". In JCIS '06: Advances in Intelligent Systems Research, 2006.

(Continued)

*Primary Examiner* — Peter Choi
(74) *Attorney, Agent, or Firm* — Fountainhead Law Group PC (57) ABSTRACT

In one embodiment the present invention includes a computer-implemented method of measuring process compliance. The method includes storing an adopted reference model of a business process and storing process instances of the business process. The method further includes generating an as-is model from the plurality of process instances. The method further includes calculating a sequence-based compliance measurement between the adopted reference model and the as-is model. The method further includes outputting the sequence-based compliance measurement. The sequence-based compliance measurement may be used to evaluate or to improve the business process.

20 Claims, 7 Drawing Sheets

OTHER PUBLICATIONS

J. Mendling and C. Simon. "Business Process Design by View Integration". In Business Process Management Workshops, pp. 55{64, 2006.

A. Rozinat, M. Veloso, and W.M.P. van der Aalst. "Evaluating the Quality of Discovered Process Models". In W. Bridewell et al., editors, IPM '08: Intl. Workshop on the Induction of Process Models, pp. 45{52, Antwerp, Belgium, 2008.

Supply-Chain Council. Supply Chain Operations Reference Model, SCOR, 2006.

W.M.P. van der Aalst. Verification of Workflow Nets. In ICATPN '97: Intl. Conf. on Application and Theory of Petri Nets, pp. 407{426, London, UK, 1997. Springer Berlin.

W.M.P. van der Aalst. Business Alignment: Using Process Mining as a Tool for Delta Analysis and Conformance Testing. Requir. Eng., 10(3):198{211, 2005.

W.M.P. van der Aalst, A.K. Alves De Medeiros, and A.J.M.M. Weijters. "Process Equivalence: Comparing Two Process Models Based on Observed Behavior". In BPM '06: Intl. conf. on business Process Management, vol. 4102, pp. 129{144. Springer Berlin, 2006.

W.M.P. van der Aalst, A. Dreiling, F. Gottschalk, M. Rosemann, and M. Jansen-Vullers. "Configurable Process Models as a Basis for Reference Modeling". In C. Bussler et al., editor, BPM '05: Intl. Workshops on the Business Process Reference Models, vol. 3812 of LNCS, pp. 512{518, 2006.

B.F. van Dongen, R. Dikman, and J. Mendling. Measuring Similarity between Business Process Models. In CAISE '08, 2008.

R.J. van Glabbeek and W. Peter Weijland. Branching Time and Abstraction in Bisimulation Semantics. Communications of the ACM, 43(3):555{600, 1996.

SAP, Components & Tools of SAP NetWeaver: SAP Solution Manager.

Ana Karla Alves de Medeiros and A.J.M.M. (Ton) Weijters. ProM Framework Tutorial v.3, May 2009.

CMMI(R) for Services, Ver. 1.2, Tecnical Report, "Improving Processes for Better Services," Feb. 2009.

J. Mendling, "Detection and Prediction of Errors in EPC Business Process Models," Dissertation submitted to the Institute of Information Systems and New Media, May 22, 2007.

A. Scheer and M. Nüttgens, "ARIS Architecture and Reference Models for Business Process Management," in: van der Aalst, W.M.P; Desel, J; Oberweis, A.: Business Process Manaement-Models, Techniques, and empirical Studies, LNCS 1806, Berlin et al. 2000 (pp. 366-379).

J. Clinch, "ITIL V3 and Information Security, " White Paper May 2009.

A. Rozinat and W.M.P. van der Aalst, "Conformance Checking of Processes Based on Monitoring Real Behavior," Group of Information Systems, Eindhoven University of Technology, Eindhoven, The Netherlands, 2008.

CobiT(R) 4.1, The IT Governance Istitute, 2007.

* cited by examiner

SYSTEM AND METHOD OF MEASURING PROCESS COMPLIANCE

CROSS REFERENCE TO RELATED APPLICATIONS

Not applicable.

BACKGROUND

The present invention relates to process compliance, and in particular, to process compliance measurement.

Unless otherwise indicated herein, the approaches described in this section are not prior art to the claims in this application and are not admitted to be prior art by inclusion in this section.

Reference models offer a set of generally accepted processes that are sound and efficient. Their adoption is generally motivated by the following reasons. First, they significantly speed up the design of process models by providing reusable and high quality content. Second, they optimize the design as they have been developed over a long period and usually capture the business insight of experts. See W. M. P. van der Aalst, A. Dreiling, F. Gottschalk, M. Rosemann, and M. Jansen-Vullers, Configurable Process Models as a Basis for Reference Modeling, in C. Bussler et al. (eds.), BPM '05: Intl. Workshops on the Business Process Reference Models, vol. 3812 of LNCS, pages 512-518 (Springer Berlin, 2006). Third, they ease the compliance with industry regulations and requirements and, thus, mitigate risk. Fourth, they are an essential means to create a link between the business needs and information technology (IT) implementations. See W. M. P. van der Aalst et al. (previously cited above).

The Information Technology Infrastructure Library (ITIL) is a set of guidance published as a series of books by the Office of Government Commerce. These books describe an integrated best practice approach to managing and controlling IT services. See OGC, Official Introduction to the ITIL Service Lifecycle (Stationery Office Books, London, 2007). The Control Objectives for Information and related Technology (COBIT) has been developed by the IT Governance Institute to describe good practices, to provide a process framework and to present activities in a manageable and logical structure. The Supply Chain Operations Reference Model (SCOR) provides a unique framework, which links business process and technology features into a unified structure to support communication among supply chain partners and to improve the effectiveness of supply chains. See Supply-Chain Council, Supply Chain Operations Reference Model (SCOR, 2006).

A process is compliant in terms of the introduced reference models if the process is implemented as described by the reference model and the process and its results comply with laws, regulations and contractual arrangements. See W. M. P. van der Aalst, Verification of Workflow Nets, in ICATPN '97: Intl. Conf. on Application and Theory of Petri Nets, pages 407-426 (Springer Berlin, London, UK, 1997). Other popular reference models include the APQC Process Classification Framework SM (PCF) (see APQC, American Productivity & Quality Center, <www.apqc.org/pcf>, 2008) and the Capability Maturity Model Integration (CMMI) (see CMMI, Software Engineering Institute, <www.sei.cmu.edu/cmmi/>, 2007).

Process mining algorithms have shown a considerable potential for assessing the compliance of instances with reference models. See A. K. Alves de Medeiros, A. J. M. M. Weijters, and W. M. P. van der Aalst, Genetic Process Mining: A Basic Approach and its Challenges, in C. Bussler and A. Haller (eds.), BPM '05: Intl. Workshops on Business Process Management, vol. 3812 of LNCS, pages 203-215 (Springer Berlin, Nancy, France, 2006); A. Rozinat, M. Veloso, and W. M. P. van der Aalst, Evaluating the Quality of Discovered Process Models, in W. Bridewell et al. (eds.), IPM '08: Intl. Workshop on the Induction of Process Models, pages 45-52 (Antwerp, Belgium, 2008). The instances are typically recorded by process-aware IS and serve as a starting point for reconstructing an as-is process model. The derived model can be compared with other models (e.g. reference models) using existing algorithms to determine the equivalence of processes.

SUMMARY

Embodiments of the present invention improve process compliance measurement. In one embodiment the present invention includes a computer-implemented method of measuring process compliance. The method includes storing an adopted reference model of a business process and storing process instances of the business process. The method further includes generating an as-is model from the plurality of process instances. The method further includes calculating a sequence-based compliance measurement between the adopted reference model and the as-is model. The method further includes outputting the sequence-based compliance measurement. The sequence-based compliance measurement may be used to evaluate or to improve the business process.

According to an embodiment, compliance may be measured between an adopted reference model and a to-be model. According to an embodiment, compliance may be measured between a to-be model and as-is model.

According to an embodiment, the sequence-based compliance measurement may be used to identify a process instance that negatively impacts the performance of the business process.

According to an embodiment, a model may be adjusted according to one or more of a granularity, an order partition, an exclusion partition, and a cycle.

According to an embodiment, the sequence-based compliance measurement may be used to iteratively adjust the to-be process model, to see whether the adjustment results in an improvement of the business process.

According to an embodiment, the sequence-based compliance measurement may include one or more of a compliance degree, a compliance maturity, a firing sequence compliance, a firing sequence compliance degree, and a firing sequence compliance maturity.

According to an embodiment, a computer-readable medium embodying a computer program may control a computer system to measure process compliance, in a manner similar to that described above. According to an embodiment, a computer system may measure process compliance, in a manner similar to that described above.

The following detailed description and accompanying drawings provide a better understanding of the nature and advantages of the present invention.

DETAILED DESCRIPTION

Described herein are techniques for measuring compliance of a business process. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In the following description, the term "we" is used. This term refers to the actions of the inventors, as well as to the actions of an embodiment of the present invention (which may have been configured to operate in a particular manner by the inventors). This usage choice results from a desire to avoid extensive use of the passive voice. In a similar manner, the term "our" also includes references to an embodiment of the present invention. For example, the wording "our process" is interchangeable with the wording "an embodiment of the present invention".

Reference models can be differentiated along their scope, their granularity, and the views, which are depicted in the model. See Configurable Process Models as a Basis for Reference Modeling. We distinguish (1) reference models focusing on capturing domain-specific best practices like ITIL, COBIT, and SCOR, and (2) configurable reference models, such as SAP Solution Manager, which aim at capturing the functionalities of a software system. (For information on SAP Solution Manager, see SAP—Components & Tools of SAP NetWeaver: SAP Solution Manager.) Although the focus of this description is on the first class of models, we explain both classes shortly with respect to their characteristics and their contribution to compliance.

The SAP Solution Manager of SAP NetWeaver provides configurable reference models for business scenarios. Their usage ensures quality of the IT solution and enables traceability of all changes and, thus, compliance to the organizational needs. Most of the enterprise resource planning (ERP) vendors have similar approaches to support the configuration and implementation procedure of an information systems (IS) landscape.

As discussed above, reference models provide a set of generally accepted best practices to create efficient processes to be deployed inside organizations. However, a central challenge is to determine how these best practices are implemented in practice. One limitation of existing approaches for measuring compliance is the assumption that the compliance can be determined using the notion of process equivalence. Nonetheless, the use of equivalence algorithms is not adequate since two models can have different structures but one process can still be compliant with the other. An embodiment of the present invention is directed to a process to measure the compliance of process models with reference models.

As discussed above, reference models have gained increasing attention, because they make a substantial contribution to design and execute processes efficiently. Obviously, reference models are useful, but to which extent are these best practices adopted and implemented in a specific business context?

As discussed above, process mining algorithms have shown a considerable potential for assessing the compliance of instances with reference models. A study has evaluated the results of a compliance analysis using process mining and equivalence algorithms, and has determined that they are not sufficient in many situations. As an example, one study evaluated the compliance of an as-is process model of a passenger airline with a reference model which had incorporated the fundamentals of ITIL. See K. Gerke and G. Tamm, Continuous Quality Improvement of IT Processes based on Reference Models and Process Mining, in AMCIS '09: Americas Conf. on Information Systems (San Francisco, Calif., August, 2009). The study found that the techniques available yield low values of compliance which could not be confirmed by the passenger airline. This difference was mainly due to: (1) different levels of details, (2) partial view of process mining, and (3) overemphasis of the order of activities. First, the level of detail characterizing a process differs widely when comparing a reference model with an as-is or to-be process model. Second, the derived as-is model only partially represents the processes of the airline. The execution of the processes does not only result in log files but it also results in written record files, manual activities as well as human knowledge. Information outside the reach of process mining algorithms may compromise the results of compliance. Finally, reference models typically do not state whether dependencies between activities are compulsory. As another example, in a study on compliance using existing equivalence algorithms, the authors changed the order of activities in a reference model. While the compliance should remain the same since the reference model did not enforce a specific order for the execution of the activities, the compliance yielded different results.

In the process of discovering the above-noted shortcomings of existing compliance measurements, we developed an embodiment of the present invention as more fully detailed below. We also discuss the differences between process equivalence and process compliance and argue for the need of specific algorithms to measure the compliance between processes. We show that two models can have different structures but one process can still be compliant with the other. Furthermore, we develop a new approach and process to overcome the drawbacks identified. We measure the compliance of an as-is process model of a German passenger airline with a reference model. To validate our methodology, we compare our compliance results with two existing approaches and explain why current algorithms are not suitable to evaluate the compliance.

Based on our experiences with business processes of the air travel industry, we devised an approach and methodology to analyze the compliance between processes. The methodology identifies five entities, illustrated in FIG. 1, which may be considered when measuring the compliance with reference models: the meta reference model $M_0$, the adopted reference model $M_1$, the to-be process model $M_2$, the instances (of the to-be process model $M_2$), and the as-is process model $M_3$. Depending on the scope, a meta reference model $M_0$ may provide either generally accepted processes or a set of abstract guidelines. In both cases, and particularly in the latter case, the reference model $M_1$ needs to be adapted to the needs of an organization yielding a set of processes $M_2$. The execution of the processes generates a set of instances. The analysis of these instances provides an as-is process model $M_3$ which reflects how a process $M_2$ was executed. The level of compliance can be measured by analyzing process models $M_0$, $M_1$, $M_2$, and $M_3$. Since $M_0$ is generally specified in natural language, we will concentrate our study on analyzing models $M_1$, $M_2$, and $M_3$.

Model $M_1$ and $M_2$ may be mainly constructed manually, whereas $M_3$ may be usually inferred from log files. These log files serve as a starting point for process mining algorithms, which aim at the automatic extraction of process knowledge. Various algorithms have been developed and implemented in ProM to discover different types of process models. See A. K. Alves de Medeiros, A. J. M. M. Weijters, and W. M. P. van der Aalst, Genetic Process Mining: A Basic Approach and its Challenges, in C. Bussler and A. Haller (eds.), BPM '05: Intl. Workshops on Business Process Management, vol. 3812 of LNCS, pages 203-215 (Springer Berlin, Nancy, France, 2006); A. Rozinat, M. Veloso, and W. M. P. van der Aalst, Evaluating the Quality of Discovered Process Models, in W. Bridewell et al. (eds.), IPM '08: Intl. Workshop on the Induction of Process Models, pages 45-52 (Antwerp, Belgium, 2008). These algorithms include, for instance, Petri nets or Event-driven Process Chains (EPCs). See W. M. P. van der Aalst, Verification of Workflow Nets, in ICATPN '97: Intl. Conf. on Application and Theory of Petri Nets, pages 407-426 (Springer Berlin, London, UK, 1997); B. F. van Dongen, R. Dikman, and J. Mendling, Measuring Similarity between Business Process Models, in CAISE '08 (2008). ProM is a process mining workbench offering algorithms to discover and verify process models.

Opposing the as-is process model and the to-be process model supports the identification of potential improvements and contributes to the determination of alternative actions.

We define process compliance as the degree to which a process model behaves in accordance to a reference model. The behavior is expressed by the instances, which can be generated by the model.

Figure 2:
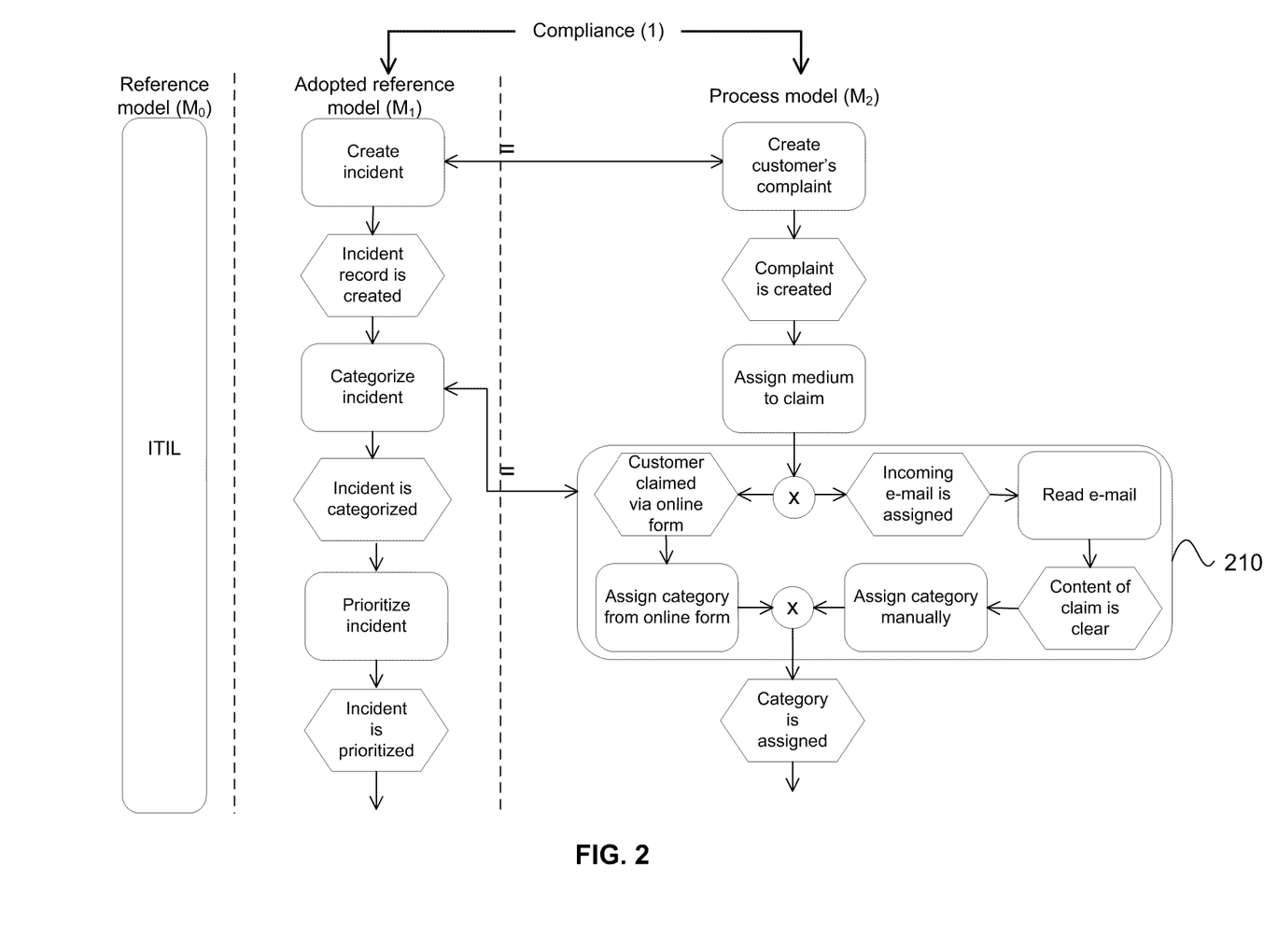
FIG. 2 is a block diagram showing two event-driven process chains, according to an embodiment of the present invention.

FIG. 2 shows two EPCs capturing similar functionalities. Both are taken from the complaint handling process of a German passenger airline. The process is supported by the application "Interaction Center" (IAC) of the SAP Customer Relationship Management (CRM) system. The IAC facilitates the processing of interactions between business partners. Each interaction is registered as an activity. Besides a complaint description, further information, such as associated documents (e.g. e-mails), may be related to activities. Based on the characteristics of a complaint, an activity of the categories "Cust. Relations" or "Cust. Payment" is established. For example, complaints associated with payments are processed by the "Cust. Payment" department.

The EPC in the center of the figure shows model $M_1$, which depicts three activities: Create incident, Categorize incident, and Prioritize incident. The EPC on the right-hand side of the figure shows model $M_2$. Processing starts with an incoming complaint. Customers can complain by sending an e-mail or by filling an online form. In the latter case, the customer has to classify the complaint. In the former case, an employee has to read the e-mail to understand the complaint and determine the category manually. To measure the compliance, we need to discuss characteristics of business and reference models.

Compliance Maturity and Degree. Our case study has identified two major concerns when it comes to evaluating compliance with reference models. First, the passenger airline wanted to learn if its processes followed the behavior recommended by the reference model. Second, the airline wanted to inquire if all the behavior recommended by the reference model was being implemented. In the context of compliance, we refer to the former as compliance degree and we denote the latter as compliance maturity. Let us consider the processing of incoming customer complaints. Model $M_1$ may recommend accepting complaints either via e-mail, letter or phone. If the airline accepts complaints via the first two mentioned communication channels only a part of the recommendations is implemented. We say that the airline is partially mature with respect to compliance maturity. But the ones currently being implemented (e-mail and letter) correspond to what the reference model $M_1$ recommends. In such a case, we say that the airline is fully compliant with respect to compliance degree.

Granularity of Models. Having two models $M_1$ and $M_2$ it may happen that the granularity characterizing the level of detail of activities varies. For example, in FIG. 2, the activity "Prioritize incident" exists in model $M_1$, but no such activity exists in model $M_2$. Furthermore, it is possible that compliance applies to a set of activities, rather than individual activities. For example, the activity "Categorize incident" of model $M_1$ corresponds to a set of activities 210 in model $M_2$ in FIG. 2. In order to account for the granularity we may identify the correspondence of activities. Correspondence is a mapping between activities of model $M_2$ to activities of model $M_1$ where the functionality of the activities is the same. Existing approaches, for example schema or semantic matching, assume that the correspondence can be established automatically based on the labels. See B. F. van Dongen, R. Dikman, and J. Mendling, Measuring Similarity between Business Process Models, in CAISE '08 (2008); and M. Ehrig, A. Koschmider, and A. Oberweis, Measuring Similarity between Semantic Business Process Models, in APCCM '07: Asia-Pacific Conf. on Conceptual Modeling, pages 71-80 (Darlinghurst, Australia, 2007). The examples of our use case show that it is not realistic to only assume that equivalent activities may be identified by considering similarities of labels. For example, the activities "Create incident" in model $M_1$ and "Create customer's complaint" in model $M_2$ have the same functionality, but they have different labels. Since the automatic mapping is not applicable, we favor the manual mapping.

Figure 3:
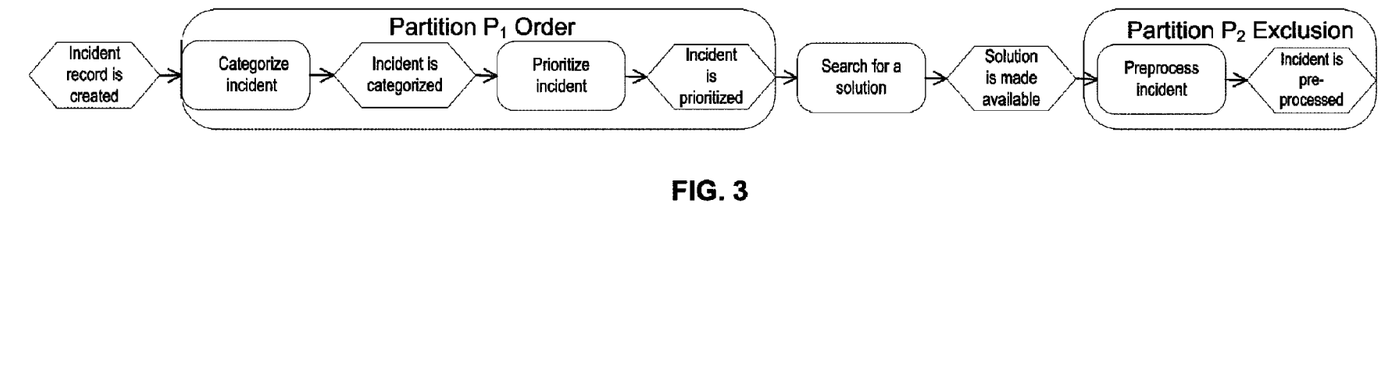
FIG. 3 is a block diagram showing partitions, according to an embodiment of the present invention.

Customization of the Reference Model. It is often important to treat parts of model $M_1$ in a special way when measuring compliance. For example, since reference models do not typically state if the activities have to be executed exactly in a specified order, the order may not always be important. We refer to these special parts as partitions. A partition is a user-selected set of activities with a type, which can be "Order" or "Exclusion". FIG. 3 shows that activities "Categorize incident" and "Prioritize incident" in partition $P_1$ may be executed in an arbitrary order. A partition of type "Exclusion"

allows the definition of activities that may be excluded from the compliance analysis. Consider partition $P_2$. In our use case, the preprocessing of an incident is not supported by the IS right now. However, a manual activity corresponding to the functionality expressed by activity "Preprocess incident" is executed. To prevent the missing activity from erroneously affecting the compliance, the activity is excluded.

Iteration. A special circumstance is the case in which an activity is part of an arbitrary cycle in process $M_2$ while it is not in model $M_1$. This means that this activity can be executed repetitively, while in model $M_1$ it must be performed correctly in only one iteration. For example, in our use case, the activities "Search for a solution" and "Inform Customer" are performed repeatedly until the customer accepts the processing of the claim. The existence of the cycle increases the quality of the process and contributes to a higher degree of the customer satisfaction. Thus, even if ITIL does not explicitly recommend a cycle, the airline feels that this cycle in model $M_2$ does not affect the compliance with model $M_1$—a contrast with a cycle, which purely means to redo work. The latter cycle negatively affects the efficiency of a process. What makes it even more complicated is the fact that various reference models neither contain cycles nor state a precise number of recommended iterations. Without knowing the semantics of cycles it is not possible to state in general its effect on compliance.

Sequence-Based Compliance

Figure 8:
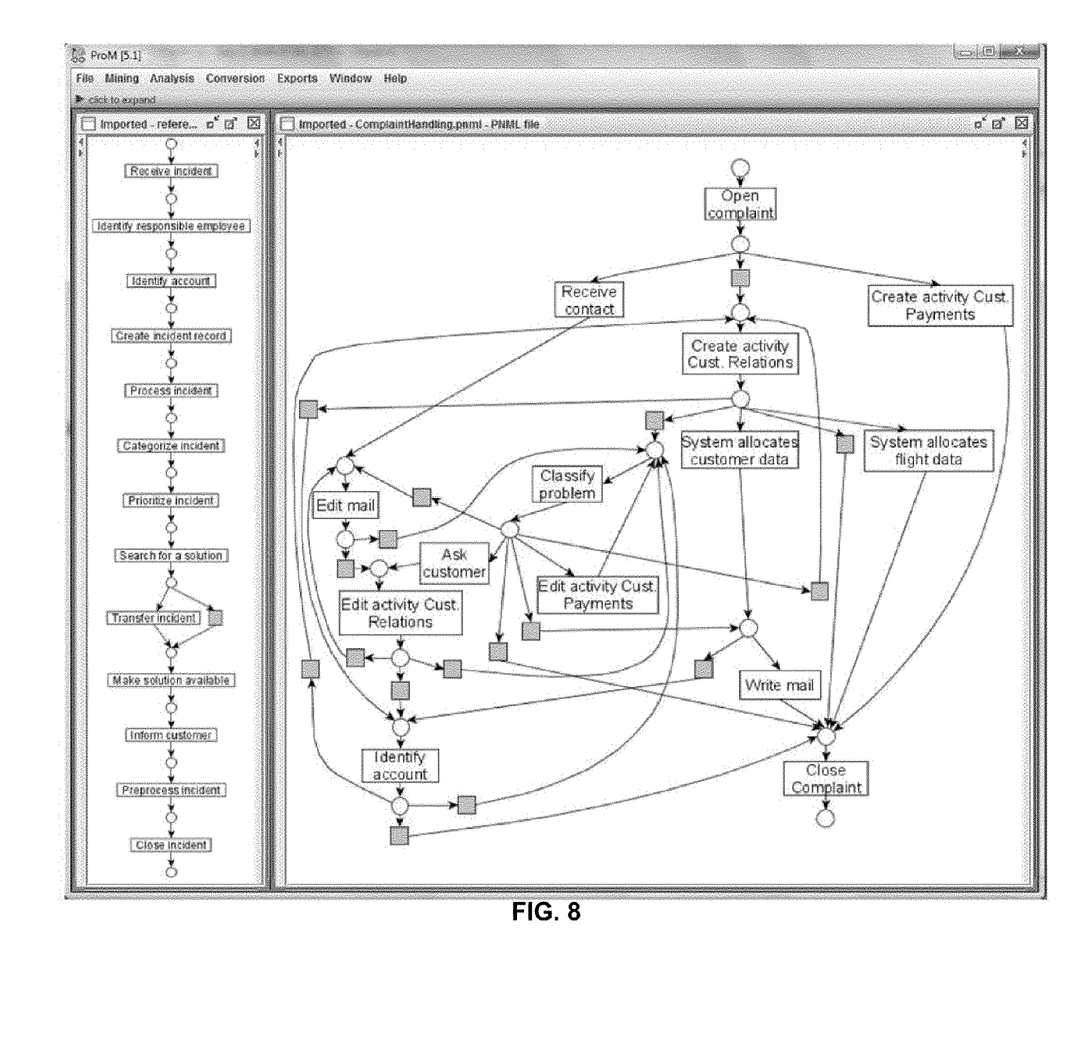
FIG. 8 is a screen shot showing an example workflow net.

Based on the requirements discussed above, we have developed a computer-implemented process to measure the compliance of model $M_2$ or $M_3$ with model $M_1$. One feature is that two models can have different structures but the algorithm can still judge one process to be compliant with the other. FIG. 8, for example, illustrates that the process models are different, but we will show that they are compliant.

Previous sections have used the EPC language to model processes since it is easy to understand and it is widely used in the industry (e.g. the common language of our use case). An embodiment of the present invention uses a more formal approach based on workflow nets (WF-nets) for the design of the compliance measurement process. WF-nets are described in W. M. P. van der Aalst, Verification of Workflow Nets, in ICATPN '97: Intl. Conf. on Application and Theory of Petri Nets, pages 407-426 (Springer Berlin, London, UK, 1997). WF-nets are a formalism well suited to analyze processes since there is a vast amount of research done in this area. We define the degree of compliance based on the firing sequences of WF-nets.

Definition 1 (WorkFlow net). A WorkFlow net (WF-net) is a tuple $M=(P, T, F, i, o)$ such that: P is a finite set of places, T is a finite set of transitions, $P \cap T = \emptyset$, $F \subseteq (P \times T) \cup (T \times P)$ is a set of arcs, $i \in P$ is the unique source place such that $\bullet i = \emptyset$, $o \in P$ is the unique sink place such that $o \bullet = \emptyset$, every node $x \in P \cup T$ is on a path from i to o, where for each node $x \in P \cup T$ the set $\bullet x = \{y | (y, x) \in F\}$ is the preset of x and $x \bullet = \{y | (x, y) \in F\}$ is the postset of x.

Transitions represent the activities of an instance. The input place (i) and the output place (o) of the WF-net express the entry point when instances are created and the exit point when instances are deleted. The last requirement ensures that there are no transitions and places which do not contribute to processing.

Definition 2 (Firing sequence). Let $M=(P, T, F, i, o)$ be a WF-net and let $t \in T$ be a transition of M. A marking K: $P \to \mathbb{N}$ is a mapping defining the number of tokens per place. t is enabled in a marking K if $(\forall p \in \bullet t)\, K(p) \geq 1$. t fires from marking K to marking K', denoted by $K[t\rangle K'$, if t is enabled in K and $(\forall p \in \bullet t)\, K'(p) = K(p)-1$ and $(\forall p \in t\bullet)\, K'(p) = K(p)+1$.

$\sigma = \langle t_1, t_2, \ldots, t_n \rangle \in T^*$ is a firing sequence leading from a marking $K_1$ to a marking $K_{n+1}$, denoted by $K_1[\sigma\rangle K_{n+1}$, if there are markings $K_2, \ldots, K_n$, such that $K_1[t_1\rangle K_2 [t_2\rangle \ldots K_n[t_n\rangle K_{n+1}$.

To capture relevant behavior we restrict ourselves to firing sequences representing process instances that are terminated properly.

Definition 3 (Complete sound firing sequences). Let $M=(P, T, F, i, o)$ be a WF-net and $\sigma \in T^*$. $K_i$ is the initial marking with $K_i(i)=1$ and $(\forall p \neq i)\, K_i(p)=0$. $K_o$ is the final marking with $K_o(o)=1$ and $(\forall p \neq o)\, K_o(p)=0$. $\sigma$ is a complete sound firing sequence, if $K_i[\sigma\rangle K_o$. Let us use $S(M)$ to denote the set of all complete sound firing sequences.

This definition ignores unsound behavior, for instance process instances running into a deadlock or a livelock. When no ambiguity occurs, we simply refer to $\sigma$ as a firing sequence.

Since WF-nets can be considered as directed graphs, where $P \cup T$ is the set of nodes and F is the set of arcs, we use the standard graph-theoretical notion of a cycle.

Definition 4 (Cycle). A cycle in a WF-net $M=(P, T, F, i, o)$ is a sequence of nodes $(x_1, \ldots, x_n) \in (P \cup T)^*$, such that $(\forall 1 \leq i < n)\, (x_i, x_{i+1}) \in F$ and $x_1 = x_n$.

The existence of cycles causes the set $S(M)$ to be in general infinite. Therefore, we restrict the number of unroll factors for cycles by a variable parameter. (We omit the parameter here and in subsequent equations since it has no significant effect to the equations and we want to keep them readable.) We end up with a finite subset of $S(M)$ denoted by $S'(M)$. The set $S'(M)$ grows exponentially in the number of transitions |T|. (Note that despite the exponential growth, an implementation example [described below] using an embodiment of the present invention shows that our approach can be used in practice.) Our strategy to deal with cycles and their contribution to compliance among competing requirements (see the requirements discussion above with reference to FIG. 2) is to equate cycles having no correspondence in model $M_1$ with the action of redoing work. The superfluous work may have a negative effect on the compliance values.

To account for the special characteristics of compliance with reference models, which we have identified above with reference to FIG. 2 and surrounding text, we use several parameters in our process.

Definition 5 (Granularity mapping). Let $M_1=(P_1, T_1, F_1, i_1, o_1)$ and $M_2=(P_2, T_2, F_2, i_2, o_2)$ be two WF-nets where we refer to $M_1$ as the reference model and to $M_2$ as the process model. We use a mapping $G: T_2 \to T_1$ to map activity labels in the process model to activity labels in the reference model. Since G can be non-injective, this mapping can handle granularity differences between the two models. Let us use the term "granularity mapping" for G.

Definition 6 (User-selected partition). Let $M_1$ be a reference model as stated in Def. 5. A user-selected partition of $M_1$ is a set of transitions $p \subset T_1$ which can be of type exclusion or order. User-selected partitions of type exclusion are represented with $\bar{p}$ and those of type order with $\breve{p}$. $M_1$ can have associated with it at most one user-selected partition of type exclusion and an arbitrary finite number of user-selected partitions of type order. Let us use P to denote the set of all user-selected partitions associated with $M_1$.

Now that we have defined the parameters, we deduce the compliance measures.

Definition 7 (Extended firing sequence set, Mapped firing sequence set). Let $M_1$ and $M_2$ be the reference model and the process model as stated in Def. 5. Let P be the set of all user-selected partitions related to $M_1$ and let G be the granularity mapping between $M_1$ and $M_2$. Let $\sigma_1 \epsilon T_1^*$ and $\sigma_2 \epsilon T_2^*$. $\sigma_1^{ext}(P)$ is the set of extended firing sequences of $\sigma_1$, which is derived from $\sigma_1$ by applying two actions to $\sigma_1$: (1) remove the transitions in $\bar{p}$ from $\sigma_1$ and (2) generate the permutations of $\sigma_1 \backslash \bar{p}$ for all user-selected partitions $\check{p}$. Let us use $|\sigma_1|_{ext} = |\sigma_1'|(\sigma_1' \epsilon \sigma_1^{ext}(P))$ to denote the length of an arbitrary extended firing sequence $\sigma_1'$ of $\sigma_1$. $\sigma_2^{map}(G)$ is the set of mapped firing sequences of $\sigma_2$, which is derived from $\sigma_2$ by applying G to all transitions of $\sigma_2$, whereas for each subsequence of transitions of $\sigma_2$, which are mapped to the same transition $t_1 \epsilon T_1$ only one occurrence of $t_1$ is placed in the resulting sequences, but possibly at different positions resulting in several mapped sequences. Let us use $|\sigma_2|_{map} = |\sigma_2'|$ ($\sigma_2' \epsilon \sigma_2^{map}(P)$) to denote the length of an arbitrary mapped firing sequence $\sigma_2'$ of $\sigma_2$.

Note that $|\sigma_1|_{ext}$ is well defined. The length of all extended sequences $\sigma_1' \epsilon \sigma_1^{ext}(P)$ is equal since they differ only in the order of transitions. The same holds for $|\sigma_2|_{map}$. Removing transitions by $\bar{p}$ guarantees $|\sigma_1|_{ext} \leq |\sigma_1|$ and the mapping of possible multiple transitions to one transition ensures $|\sigma_2|_{map} \leq |\sigma_2|$.

Definition 8 (Compliance measures). Let $M_1$, $M_2$, G and P be as stated in the definitions above. Let $\sigma_1 \epsilon T_1^*$ and $\sigma_2 \epsilon T_2^*$. The firing sequence compliance (fsc) of $\sigma_2$ w.r.t. $\sigma_1$ is:

$$fsc(\sigma_2,\sigma_1,P,G) = \max\{lcs(s,s') | s \epsilon \sigma_1^{ext}(P), s' \epsilon \sigma_1^{map}(G) \quad (1)$$

The firing sequence compliance degree (fscd) of $\sigma_2$ w.r.t. $\sigma_1$ is:

$$fscd(\sigma_2, \sigma_1, \mathcal{P}, \mathcal{G}) = \frac{fsc(\sigma_2, \sigma_1, \mathcal{P}, \mathcal{G})}{|\sigma_1|_{map}} \quad (2)$$

The firing sequence compliance maturity (fscm) of $\sigma_2$ w.r.t. $\sigma_1$ is:

$$fscm(\sigma_2, \sigma_1, \mathcal{P}, \mathcal{G}) = \frac{fsc(\sigma_2, \sigma_1, \mathcal{P}, \mathcal{G})}{|\sigma_1|_{ext}} \quad (3)$$

The compliance degree (cd) of $M_2$ w.r.t. $M_1$ is given by:

$$cd(M_2, M_1, \mathcal{P}, \mathcal{G}) = \frac{\sum_{\sigma_2 \in S'(M_2)} \max_{\sigma_1 \in S'(M_1)} \{fscd(\sigma_2, \sigma_1, \mathcal{P}, \mathcal{G})\}}{|S'(M_2)|} \quad (4)$$

The compliance maturity (cm) of $M_2$ w.r.t. $M_1$ is given by:

$$cm(M_2, M_1, \mathcal{P}, \mathcal{G}) = \frac{\sum_{\sigma_1 \in S'(M_1)} \max_{\sigma_2 \in S'(M_2)} \{fscm(\sigma_2, \sigma_1, \mathcal{P}, \mathcal{G})\}}{|S'(M_1)|} \quad (4)$$

Function lcs in (1) calculates the length of the longest common subsequence of two firing sequences. Having a firing sequence $\sigma_1$, we would like to know if a firing sequence $\sigma_2$ is similar (or vice versa). Since the lcs function in (1) returns the longest common subsequence of firing sequences $\sigma_1$ and $\sigma_2$, the greater the value returned, the more similar the two firing sequences are. Since the firing sequences $\sigma_1$ and $\sigma_2$ can have various structures when they have an extended firing sequence set or/and a mapped firing sequence set, function fsc will select the variation of $\sigma_1$ and $\sigma_2$ which will yield a greater similarity of $\sigma_1$ and $\sigma_2$ using function lcs. For more details on lcs, see L. Bergroth, H. Hakonen, and T. Raita, A Survey of Longest Common Subsequence Algorithms, in SPIRE '00: 7th Intl. Symposium on String Processing Information Retrieval, page 39 (IEEE Computer Society, Washington, D.C., 2000).

The compliance degree (2) of a firing sequence $\sigma_2$ indicates the extent to which the transitions of $\sigma_2$ are executed according to the specifications of a reference model expressed with $\sigma_1$ while preserving the activity order. Having selected the variations (by extension or mapping) of $\sigma_1$ and $\sigma_2$ which yield the greater similarity between $\sigma_1$ and $\sigma_2$, we would like to analyze and quantify the similarity of $\sigma_1$ and $\sigma_2$. Moreover, we would like to evaluate how many of the transitions of $\sigma_2$ are present in $\sigma_1$. Let us refer to this similarity with symbol 'c'. Symbol 'c' indicates how many transitions are shared by the two firing sequences. If the value of 'c' is close to the length of firing sequence $\sigma_2$, this implies that $\sigma_1$ is closely similar to $\sigma_2$. As a result, this indicates that the transitions of firing sequence $\sigma_2$ are executed in a similar way which is prescribed by $\sigma_1$ (a specification of a reference model). When such a case happens, function fscd (2) returns a value which is close to 1. On the other hand, if $\sigma_1$ is strongly different when compared to $\sigma_2$, this implies that their similarity value 'c' is low. As a result, the number of transitions of $\sigma_2$ that follow the transitions of $\sigma_1$ is also low, further resulting in a low compliance degree of $\sigma_2$ with the specifications of a reference model expressed with $\sigma_1$.

The compliance maturity (3) of a firing sequence $\sigma_2$ points at the extent to which the specification of a reference model expressed with $\sigma_1$ is followed by $\sigma_2$. The explanation of the mechanics of this function is similar to the explanation given from the previous function (function 2). The main contrast is that in (3) we are interested in evaluating the transitions of firing sequence $\sigma_1$ which are executed in a similar way according to the sequence described by $\sigma_2$. If the value of 'c' is close to the length of firing sequence $\sigma_1$, this implies that $\sigma_2$ is closely similar to $\sigma_1$. As a result, this indicates that the transitions of firing sequence $\sigma_1$ are executed in a similar way by $\sigma_2$. Therefore, the compliance is high.

In (4), (5), the degree and maturity of compliance express the ratio of instances, which can be produced by one model that can also be produced by the other model. From the viewpoint of compliance degree, the process model is related to the reference model; from maturity, vice versa. Here, we rely on the use of functions fscd (2) and fscm (3), which analyze the compliance of individual firing sequences, to compute the best match between all the firing sequences of $M_1$ and all the firing sequences of $M_2$. The overall computation adds the contribution of the individual firing sequences that belong to a match between the two models. The contribution of individual firing sequences is then divided by $|S'(M_1)|$ or by $|S'(M_2)|$. $|S'(M_1)|$ and $|S'(M_2)|$ represent the total number of instances present in $M_1$ and $M_2$, respectively. If we are investigating to analyze the compliance maturity, we divide by $|S'(M_1)|$ since we want to investigate how many of the instances of $M_1$ are being followed by instance of $M_2$. Otherwise, to compute the compliance degree, we divide by $|S'(M_2)|$. In this last case, we are investigating how many instance of $M_2$ are also present in $M_1$. The greater the number of instances, the greater the compliance degree.

These compliance measures return a value in interval [0; 1]. For example, if the compliance degree is 1, the compliance is the highest since all firing sequences of model $M_2$ can also be produced by model $M_1$.

Figure 4:
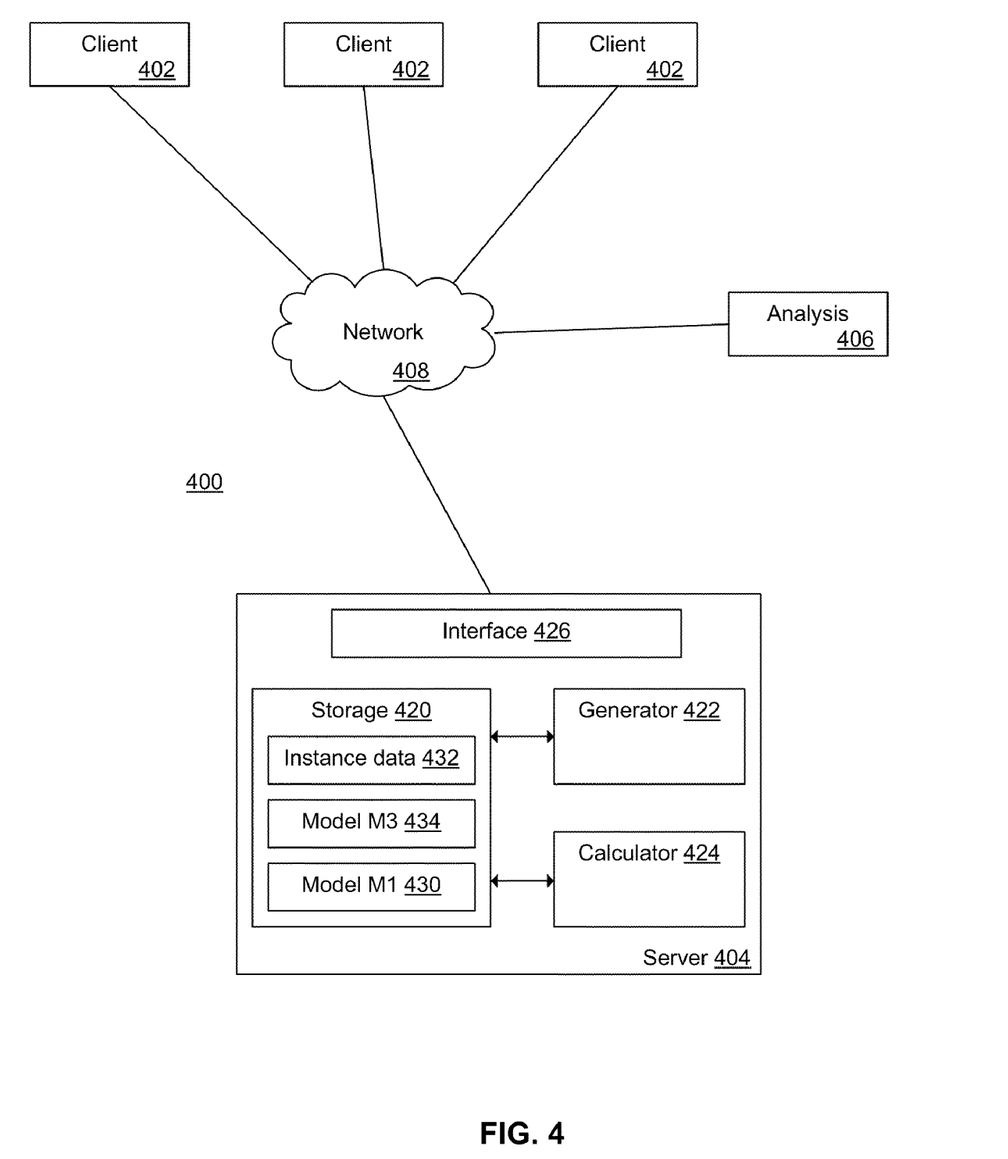
FIG. 4 is a block diagram of a computer system that implements a compliance measurement processes, according to an embodiment of the present invention.

FIG. 4 is a block diagram of a computer system 400 that implements the above processes, according to an embodiment of the present invention. The computer system 400 includes a number of client computers 402, a server computer 404, and an analysis computer 406. A network 408 connects the client computers 402, the server computer 404 and the analysis client computer 406. The network 408 may be implemented with one or more network elements, e.g., local area network(s), wide area network(s), the internet, etc.

Figure 1:
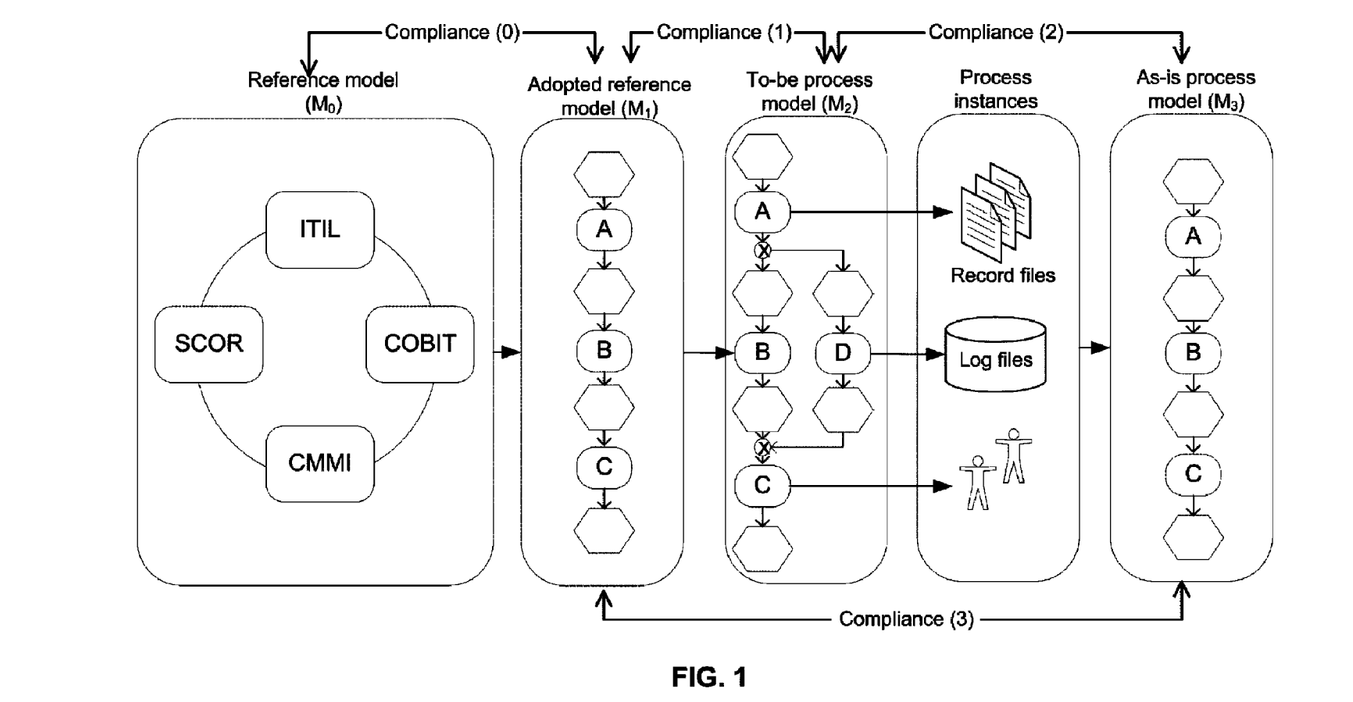
FIG. 1 is a block diagram showing various business process models and compliance relationships, according to an embodiment of the present invention.

The client computers 402 generate process instances (see, e.g., FIG. 1). For example, given a to-be process model that users of the client computers 402 are following, they generate the process instances in accordance with following the to-be process model $M_2$ (see also FIG. 1). The client computers 402 may generally implement the presentation tier of a three-tier architecture, e.g., to display information that is managed by the application tier or the database tier. The client computers 402 communicate with the server computer 404.

The server computer 404 includes a storage system 420, a generation module 422, a calculation module 424, and an interface module 426. The storage system 420 stores an adopted reference model $M_1$ 430 (see also FIG. 1) and the process instance data 432 generated by the client computers 402. (The adopted reference model $M_1$ 430 is related to the to-be process model $M_2$ as shown in FIG. 1.) The generation module 422 generates an as-is model $M_3$ 434 from the process instance data 432. The calculation module calculates a sequence-based compliance measurement between the adopted reference model $M_1$ 430 and the as-is model $M_3$ 434. The interface module 426 outputs the sequence-based compliance measurement, for example to the analysis computer 406. The server computer 404 may generally implement the application tier in a three-tier architecture. (The database tier is not shown.)

The analysis computer 406 provides a user interface to interact with the server 404 to measure compliance. A process analyst may use the analysis computer 406 to control the server computer 404 to execute the compliance measurements discussed above.

According to an embodiment, the server computer 404 identifies a process instance that negatively impacts the sequence-based compliance measurement. For example, if a user of a client computer 402 has generated a process instance that is outside of compliance, then this can be identified (and corrective action can be taken to prevent recurrence of the non-compliance).

According to an embodiment, the server computer 404 adjusts the to-be process model according to the sequence-based compliance measurement, the client computers 402 generate additional process instances, and the server computer 404 re-calculates the sequence-based compliance measurement. This process may be performed iteratively. In this manner, it can be determined whether adjusting the to-be process model results in an improvement of the business process. According to a further embodiment, adjustment of the to-be process model can involve human intervention. This human intervention may include a manual approval process of suggested modifications, or training for users to be made aware of the modifications.

According to an embodiment, the analysis computer 406 implements directly the functionality of the server computer 404 that is used to execute the compliance measurements (and the server computer 404 does not). For example, when the server computer 404 and the client computers 402 are operating in a production environment, the server computer 404 implements the application tier for the business process; the operation of the analysis computer 406 then does not impact the production environment.

Figure 5:
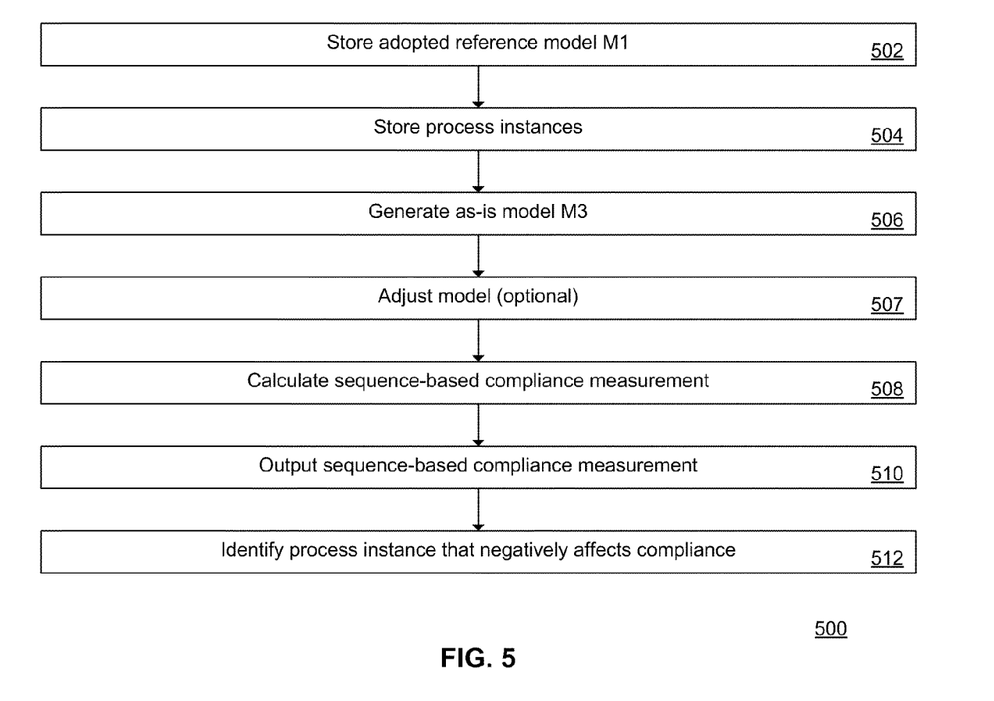
FIG. 5 is a flow diagram of a method of measuring process compliance, according to an embodiment of the present invention.

FIG. 5 is a flow diagram of a method 500 of measuring process compliance, according to an embodiment of the present invention. The method 500 may be implemented by the computer system 400 (see FIG. 4), for example, by executing one or more computer programs to control the operation of the computer system 400 according to the processes of the method 500. More specifically, parts of the method 500 may be implemented by the server computer 404 (or by the analysis computer 406).

In 502, an adopted reference model $M_1$ of a business process is stored.

In 504, a number of process instances of the business process are stored. The process instances may be recorded from the actions of users following a to-be process model $M_2$ of the business process.

In 506, an as-is model $M_3$ is generated from the process instances. An optional step 507 may be performed (see below).

In 508, a sequence-based compliance measurement is calculated between the adopted reference model $M_1$ and the as-is model $M_3$.

In 510, the sequence-based compliance measurement is output. The sequence-based compliance measurement may include two compliance indicators: compliance degree and compliance maturity.

In 512, a process instance that negatively impacts the sequence-based compliance measurement is identified. Corrective action may then be taken based on this identification to improve a future sequence-based compliance measurement.

According to an embodiment, in 507 the models may be prepared or adjusted. According to an embodiment, the adjustment 507 may occur prior to operation of a step such as the calculation step 508. The preparation of a model may include three substeps. First, the process model is mapped. The mapping may be accomplished in a manner similar to that discussed above regarding FIG. 2 (note that the model may be adjusted according to the granularity, exclusion, etc.). Second, the reference model may be customized. The customization may be accomplished in a manner similar to that discussed above in the section "Customization of the Reference Model". Third, any iterations may be accommodated in the model, in a manner similar to that discussed above in the section "Iteration".

Figure 6:
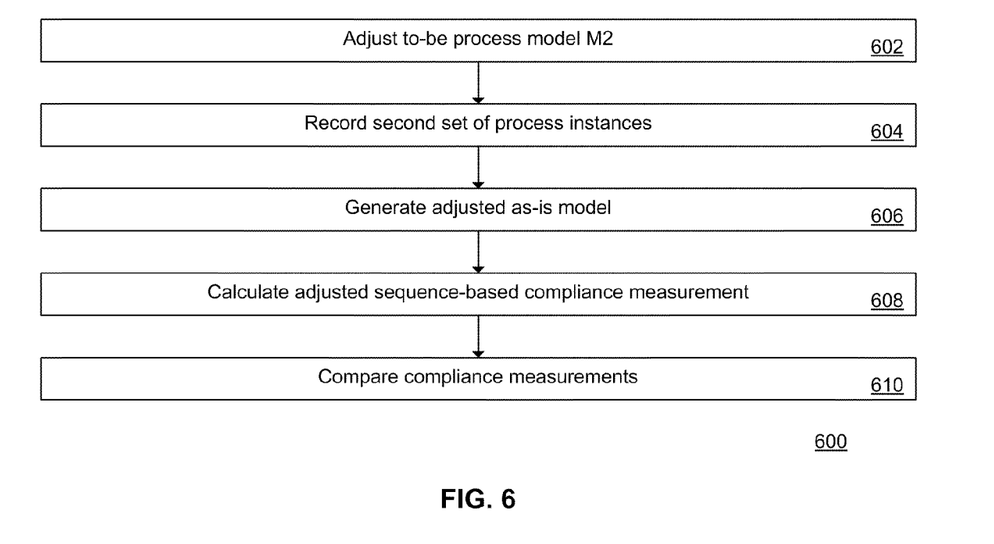
FIG. 6 is a flow diagram of a method of adjusting a to-be process model to improve the sequence-based compliance measurement, according to an embodiment of the present invention.

FIG. 6 is a flow diagram of a method 600 of adjusting a to-be process model $M_2$ to improve the sequence-based compliance measurement, according to an embodiment of the present invention. The process instances are generated according to the to-be process model $M_2$, which is developed from the adopted reference model $M_1$ (see FIG. 1). The method 600 may be performed iteratively, or continuously, in order to improve the sequence-based compliance measurements made according to the method 500. The method 600 may be performed by the computer system 400 (see FIG. 4) in a manner similar to that discussed above with reference to FIG. 5. The method 600 may involve human intervention similar to that discussed above.

In 602, the to-be process model $M_2$ is adjusted according to the sequence based compliance measurement to produce an adjusted to-be process model. For example, the sequence based compliance measurement (see FIG. 5) may indicate that the business process is less than fully compliant with the adopted reference model $M_1$, which indicates improvement may be possible.

In 604, a second set of process instances are recorded according to the adjusted to-be process model. More specifically, the users are now using the adjusted to-be process model instead of the original to-be process model.

In 604, an adjusted as-is model is generated from the second set of process instances (see 506 in FIG. 5).

In 606, an adjusted sequence-based compliance measurement between the adopted reference model and the adjusted as-is model is generated (see 508 in FIG. 5).

In 608, the adjusted sequence based compliance measurement is compared with the sequence based compliance measurement, to determine whether the adjusted to-be process model resulted in an improvement of the business process.

As described above, an embodiment of the present invention measures compliance between the adopted reference model $M_1$ and the as-is model $M_3$. Note that other embodiments may measure the compliance between other models (see, e.g., FIG. 1). According to an embodiment, compliance is measured between the adopted reference model $M_1$ and the to-be process model $M_2$. According to an embodiment, compliance is measured between the to-be process model $M_2$ and the as-is model $M_3$.

Figure 7:
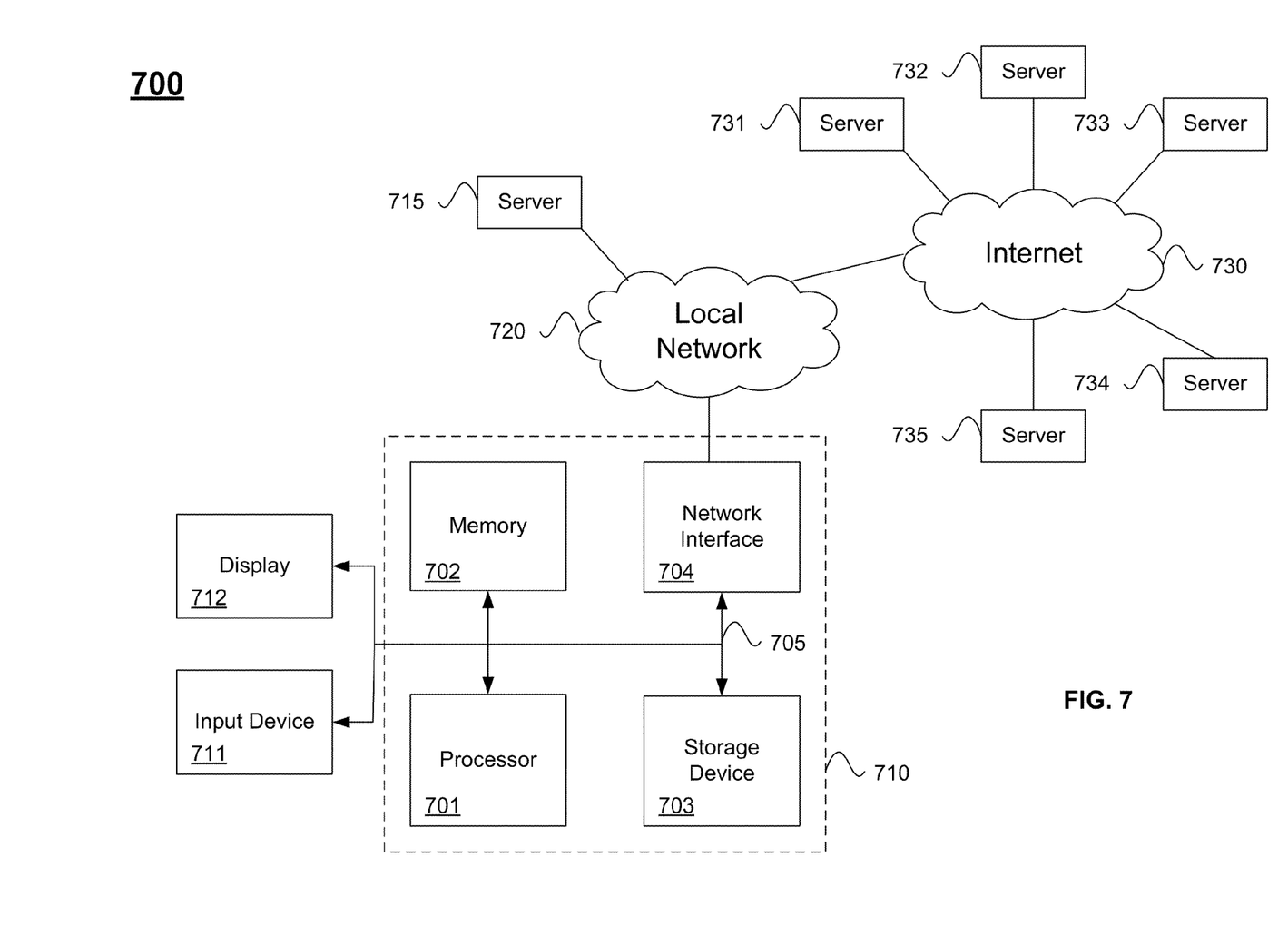
FIG. 7 is a block diagram of an example computer system and network for implementing an embodiments of the present invention.

FIG. 7 is a block diagram of an example computer system and network 700 for implementing embodiments of the present invention. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above. This memory may also be used for storing temporary variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques or embodying the constructs above, for example.

Computer system 710 may be coupled via bus 705 to an output device 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 704 sends and receives electrical, electromagnetic, or optical signals that carry digital data streams representing various types of information.

Computer system 710 can send and receive information, including messages or other interface actions, through the network interface 704 to an Intranet or the Internet 730. In the Internet example, software components or services may reside on multiple different computer systems 710 or servers 731, 732, 733, 734 and 735 across the network. A server 731 may transmit actions or messages from one component, through Internet 730, local network 720, and network interface 704 to a component on computer system 710.

According to an embodiment, the client computer 402 (see FIG. 4) may be implemented by the computer system 710. According to an embodiment, the analysis computer 406 (see FIG. 4) may be implemented by the computer system 710. According to an embodiment, the server computer 404 (see FIG. 4) may be implemented by the server 731, which may include internal components similar to those of the computer system 710.

Operational Example

This section applies the sequence-based compliance analysis to the case study discussed above and compares the results with two existing approaches available in ProM: "Structural Precision/Recall" and "Footprint Similarity". We have chosen these two approaches since they are sometimes used to determine the compliance between models. We discuss the results of our study below.

Measuring Sequence-based Compliance. FIG. 8 shows the starting point for the compliance analysis in ProM: two WF-nets. The left-hand side model portrays the reference model $M_1$, which was adopted from ITIL. Initially created as an EPC in the ARIS toolset, it has been converted into a WF-net and imported into ProM. The right-hand side model illustrates the as-is model $M_3$, which represents the complaint handling process of the passenger airline. It was extracted with the ProM plugin "Heuristic Miner" from a log file containing 4,650 cases and 44,006 events being observed over a period of one year. (Further details of the Heuristic Miner can be found at <www.processmining.org>.)

Figure 9:
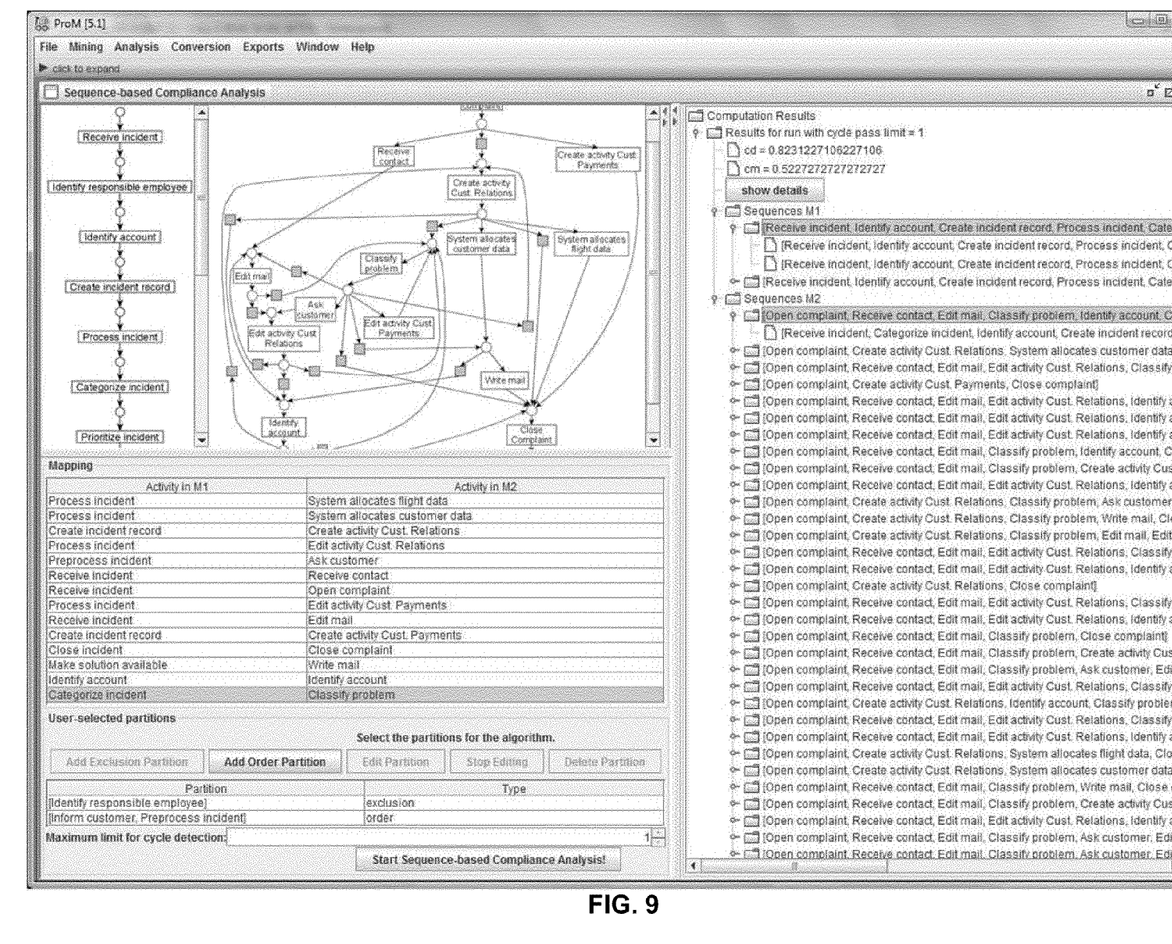
FIG. 9 is a screen shot showing an example mapping.

To adapt the reference model to the needs of the airline, model $M_1$ was customized as follows. The activity Identify responsible employee was excluded because the activity was not recorded by the IS. The airline assumes that the activities Inform customer and Preprocess incident may be executed in an arbitrary order. As a result, the airline has agreed on a user-selected partition of type exclusion ($\bar{p}$={Identify responsible employee}) as well as on a partition of type order ($\breve{p}$={Inform customer, Preprocess incident}). Besides the user-selected partitions, the left-hand side of FIG. 9 shows the granularity mapping. Please note, that the figure denotes the adopted reference model $M_1$ and the as-is model $M_2$. During the mapping, we found typical characteristics in the airline process discussed above (see FIG. 2 and related text): missing and additional activities and activities with different levels of detail. For example, the activity "Prioritize incident" is missing in model $M_3$ and the activities "Create activity Cust. Relations" and "Create activity Cust. Payments" of model $M_3$ correspond to the activity "Create incident" in model $M_1$. FIG. 8 shows that the airline uses iterations: model $M_3$ has cycles. Since the cycles are seen as quality improvement, the limit for cycle detection is set to 1. This limit ensures that all activities are considered but that the iteration of activities is not punished.

The right-hand side of FIG. 9 illustrates the results of our compliance analysis. Visible are the compliance degree and compliance maturity, which were computed according to Equations (4 and 5) per passed cycle as well as the extended firing sequences $\sigma_1^{ext}(P)$ of model $M_1$ and the firing sequences $\sigma_3^{map}(G)$ of model $M_3$. Unrolling a cycle once, yields the compliance degree $cd(M_3, M_1, P, G)$ of 0.82 and the compliance maturity $cm(M_3, M_1, P, G)$ of 0.52. To explain these values, we study the first line of the sequences $\sigma_1$ and $\sigma_3$, respectively. We consider the following extended firing sequence $\sigma'_{1-1}$=⟨Receive incident, Identify account, Create incident record, Process incident, Categorize incident, Prioritize incident, Search for a solution, Make solution available, Inform customer, Preprocess incident, Close incident⟩ and $\sigma''_{1-1}$=⟨Receive incident, Identify account, Create incident record, Process incident, Categorize incident, Prioritize incident, Search for a solution, Make solution available, Preprocess incident, Inform customer, Close incident⟩, $\sigma'_{1-1}$, $\sigma''_{1-1} \in \sigma_1^{ext}(P)$. Let us also consider the firing sequence $\sigma_{3-1}$=⟨Open complaint, Receive contact, Edit mail, Classify problem, Identify account, Create activity Cust. Relations, System allocates flight data, Close complaint⟩, which results in the firing sequence $\sigma'_{3-1}$=⟨Receive incident, Categorize incident, Identify account, Create incident record, Process incident, Close incident⟩$\in \sigma_3^{map}(G)$. Since the maximum common longest subsequence of $\sigma'_{1-1}$ and $\sigma''_{1-1}$ with $\sigma'_{3-1}$ corresponds to ⟨Receive incident, Identify account, Create incident record, Process incident, Close incident⟩, the firing sequence compliance $fsc(\sigma_{3-1}, \sigma_{1-1}, P, G)$ is 5. The firing sequence compliance degree $fscd(\sigma_{3-1}, \sigma_{1-1}, P, G)$ is 5/6. This means that the instance $\sigma_{3-1}$ of the as-is process model follows the order of the reference model with an overlap of 83%. The firing sequence compliance maturity $fscm(\sigma_{3-1}, \sigma_{1-1}, P, G)$ is 5/11. This means that only 45% of instance $\sigma_{1-1}$ prescribed by the reference model are being followed by instance $\sigma_{3-1}$ of the as-is process model. The result of the compliance degree of 82% indicates that the processes executed by the airline correspond to the recommendations of the reference model. We can say that, although the models $M_3$ and $M_1$ look different, the model $M_3$ is highly compliant with reference model $M_1$. The compliance maturity of 52% indicates that there are recommendations in reference model $M_1$ which are not implemented by the airline. Nonetheless, because of the maturity value of 52% we can conclude that model $M_3$ is also partially mature with reference model $M_1$.

Measuring Precision and Recall. Structural precision and recall are introduced in W. M. P. van der Aalst, A. K. Alves de Medeiros, and A. J. M. M. Weijters, Process Equivalence: Comparing Two Process Models Based on Observed Behavior, in BPM '06: Intl. Conf. on Business Process Management, vol. 4102, pages 129-144 (Springer Berlin, 2006). Precision$^S$ ($M_1, M_2$) is the fraction of connections in $M_2$ that also appear in $M_1$. If this value is 1, the precision is the highest because all connections in the second model exist in the first model. Recall$^S$ ($M_1, M_2$) is the fraction of connections in $M_1$ that also appear in $M_2$. If the value is 1, the recall is the highest because all connections in the first model exist in the second model. To analyze the compliance, model $M_1$ and $M_3$ of our use case need to be represented by a heuristic net. Therefore, we have converted model $M_1$, originally represented by an EPC, into a Heuristic net using ProM. Since the ProM plugin expects same labels, we have renamed the labels of model $M_3$ according to model $M_1$ and carried out the mapping depicted in FIG. 9. The structural precision obtained was 3% and the recall was 8%.

Measuring Causal Footprint. The causal footprint is the second approach we have compared with our process. (The causal footprint is described in B. F. van Dongen, R. Dikman, and J. Mendling, Measuring Similarity between Business Process Models, in CAISE '08 [2008].) The footprint identifies two relationships between activities: look-back and look-ahead links. The present detailed description does not elaborate on the corresponding equation due to its complexity. Since the analysis of the causal footprint is based on comparing two EPCs, we have converted model $M_3$ into an EPC using a conversion plugin in ProM. According to an embodiment, the mapping was manually performed in accordance to the mapping shown in FIG. 9. To analyze the causal footprint, the ProM plugin "Footprint Similarity" was used and yielded a result of 27%.

Evaluation

This section discusses the compliance values, which we yielded in the Operational Example section above based on the requirements discussed above with reference to FIG. 2 and related text.

Precision and recall rely on the notion of equivalence and expect process models, which need to be compared, to be equal in their structure. This is the reason why the values obtained are relatively low: 3% and 8%, respectively. Similar to our approach, these two measures allow an analysis of the compliance from the perspectives compliance degree (i.e. precision) and compliance maturity (i.e. recall). By contrast, the approach neither offers a mapping functionality nor accounts for the necessary customization of the reference model: ordering or exclusion of activities. Expressing the behavior of a model in terms of connections results in the loss of information whether two connected transitions are part of a cycle and neglects the control flow of process models. However, these are relevant information when measuring the compliance with reference models.

The causal footprint also relies on the notion of equivalence. However, the approach assumes that process models with different structures may be similar. Therefore, the result of 27% is closer to the values obtained when using the process we have developed (i.e. 82% and 52%). Since the formula is symmetric, measuring the compliance of model $M_3$ with model $M_1$ or of model $M_1$ with model $M_3$ yields the same value. It is clear that this situation is perfectly aligned with the notion of equivalence but fails to meet the requirements of determining compliance from the perspectives degree and maturity. Like our approach, the notion of mapping is included in the plugin. However, a non-injective mapping is not supported. Since the algorithm accounts for the ordering of activities, it partially fulfills the requirements for customization of reference models. Nonetheless, it does not account for the exclusion of activities. In B. F. van Dongen, R. Dikman, and J. Mendling, Measuring Similarity between Business Process Models, in CAISE '08 [2008], the authors do not state the behavior of their formula with respect to cycles.

Using evaluation systems with the notion of equivalence, we are tempted to infer that the processes are not compliant. In contrast to the sequence-based compliance, the recall and precision and the causal footprint yield a value, which is little expressive and hard to explain. It is not possible to trace the missing or dissent instances. The solution implemented according to an embodiment of the present invention obtains two different values for compliance (i.e. degree and maturity) and also calculates intermediate results from instance compliance. This enables process designers to trace back which instances are affecting positively or negatively the compliance of the processes under analysis. The industrial application shows that the notion of equivalence cannot be used with satisfactory results to evaluate the compliance of processes with a reference model.

Implementation Example

The sequence-based compliance algorithm is based on the generation of sets of firing sequences to describe the behavior of a process model. Unfortunately, in general, the size of these sets can grow exponentially with the size of the WF-net in terms of activities. This section shows the applicability of our process in spite of its exponential complexity. Similar to that described in R. Dijkman, Diagnosing Differences between Business Process Models, in BPM '08: Intl. Conf. on Business Process Management, pages 261-277 (Springer Berlin, Heidelberg, 2008), we used a sample of EPCs of the SAP reference model to test whether our process can be applied in practice by showing that the computation times are acceptable. The SAP reference model has been described in other papers. See, e.g., A. Ladd T. Curran, G. Keller, SAP R/3 Business Blueprint: Understanding the Business Process Reference Model (Prentice Hall PTR, Enterprise Resource Planning Series, Upper Saddle River, 1997); and T. Teufel and G. Keller, SAP R/3 Process Oriented Implementation: Iterative Process Prototyping (Addison-Wesley, 1998). Since it is among the most comprehensive reference models covering over 600 business processes, we assume that these models can be regarded as a representative example. The study is performed by applying the sequence-based compliance process to a subset of 126 pairs of EPCs from the SAP reference model, which we have converted to WF-nets. The pairs are put together based on their similarity computed by the ProM plugin "EPC Similarity Calculator". Our pairs are characterized with a similarity greater than 50%. Ninety percent of the process models analyzed with an embodiment of the present invention took less than 62 milliseconds. In the implementation example, the runtime of the algorithm takes on average 50.5 milliseconds with a standard deviation of 9.3 milliseconds. (The hardware used for this analysis included an AMD™ dual core CPU running at 2.0 GHz, running Microsoft Windows Vista™ with 2 GB of memory.) The average number of activities in the processes of a model pair is 16. We only found a weak correlation between runtime and the number of activities of a process. Therefore, we conclude that for the number of activities, which we found in the SAP reference models, the sequence-based compliance analysis is applicable. These results show that, in theory we are confronted with exponential runtime when the complexity is measured in terms of the input size only, i.e. activities. However, in practice there are natural boundaries, e.g. the number of activities per process model is between a lower bound and an upper bound. Hence, the process can be used in practice despite its exponential complexity.

An alternative to address complexity with regard to the input size of the algorithm is to capture the behavior of a model using the state space of a WF-net. A state space corresponds to the set of reachable markings of a WF-net. See T. Basten and W. M. P. van der Aalst, Inheritance of Behavior, in Journal of Logic and Algebraic Programming, 47(2):47-145 (March/April 2001). The resulting graph is denoted as the reachability graph. In P. Buchholz and P. Kemper, Hierarchical Reachability Graph Generation for Petri Nets, in Form. Methods Syst. Des., 21(3):281-315 (2002) is presented a method focusing on optimizing the generation of the reachability graph of large Petri nets. The central idea is to decompose a net, to generate reachability graphs for the parts and to combine them. Furthermore, there exist various techniques for state space reduction (see R. Dijkman, Diagnosing Differences between Business Process Models, in BPM '08: Intl. Conf. on Business Process Management, pages 261-277 [Springer Berlin, Heidelberg, 2008]), which may be exploited to improve the efficiency of the underlying algorithm of the sequence-based compliance algorithm. Corresponding approaches are referred to reduction rules. These rules aim at reducing the size of the state space by reducing the number of places and transitions preserving information relevant for analysis purpose. For example, it is possible to account for the significance of transitions. Transitions, which are rarely executed, can be left out using abstraction or encapsulation. Again, we found arguments for the applicability of state spaces in the context of the input size. For example, Verbeek et al. argue that state spaces generating a reachability graph are often feasible for systems up to 100 transitions. See H. M. W. Verbeek, Verification and Enactment of Workflow Management Systems, PhD thesis (University of Technology, Eindhoven, The Netherlands, 2004).

CONCLUSION

As discussed above, reference models provide valuable recommendations for the implementation of business processes. However, methods and solutions to determine how these guidelines are implemented in practice are inexistent. Known algorithms to evaluate the equivalence of processes have proven to be insufficient to measure compliance since many factors and characteristics related to compliance are ignored.

In developing an embodiment of the present invention, we have investigated the characteristics of compliance and we have devised a process to analyze the compliance of process models with reference models. A feature of an embodiment of the present invention is a process, called sequence-based compliance, which is based on the observation that process models can have different structures but one process can still be compliant with the other.

In order to validate the practical operation of an embodiment of the present invention, we have measured the compliance of a complaint handling process of a German passenger airline. The passenger airline has obtained transparency of its current customer support processes by carrying out process mining on their log files. Nonetheless, the next step, which was executed according to an embodiment of the present invention, was to determine to which extent the process were aligned with a reference model (i.e. ITIL). This second step has been demonstrated as discussed above.

We have further evaluated an embodiment of the present invention by comparing the results with two existing approaches. The validation was not trivial since we applied process mining and equivalence algorithms on real data. The results have shown that the sequence-based compliance yields more insightful values when compared to the results of existing algorithms based on analyzing the equivalence of processes.

The description has focused on an example implementation regarding the complaint handling process of a German passenger airline. Note that this was for illustrative purposes as well as for showing the feasibility of the implementation using actual data. Embodiments of the present invention may be used in other types of businesses and for other types of business processes.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of measuring process compliance, comprising:
storing, by a computer system, an adopted reference model of a business process;
storing, by the computer system, a plurality of process instances of the business process;
generating, by the computer system, an as-is model from the plurality of process instances;
calculating, by the computer system, a sequence-based compliance measurement between the adopted reference model and the as-is model; and
outputting, by the computer system, the sequence-based compliance measurement,
wherein calculating the sequence-based compliance measurement comprises:
calculating a compliance degree between the adopted reference model and the as-is model,
calculating a compliance maturity between the adopted reference model and the as-is model, and
calculating a firing sequence compliance (fsc) of the as-is model with respect to the adopted reference model according to an equation:

$$fsc(\sigma_2, \sigma_1, P, G) = \max\{lcs(s, s') \mid s \in \sigma_1^{ext}(P), s' \in \sigma_2^{map}(G)\}$$

wherein the firing sequence compliance selects a variation having a maximum similarity between a first firing sequence $\sigma_1$ and a second firing sequence $\sigma_2$,
wherein P is a set of user-selected partitions related to a first reference model $M_1$, G is a granularity mapping between $M_1$ and a second reference model $M_2$, lcs calculates a length of a longest common subsequence of two firing sequences, s is the length of a common subsequence of $\sigma_1$, and s' is the length of the common subsequence $\sigma_2$.

2. The computer-implemented method of claim 1, further comprising:
identifying, by the computer system, a process instance of the plurality of process instances that negatively impacts the sequence-based compliance measurement.

3. The computer-implemented method of claim 1, wherein the plurality of process instances are recorded according to a to-be process model, wherein the to-be process model is developed from the adopted reference model, further comprising:
adjusting the to-be process model according to the sequence-based compliance measurement to produce an adjusted to-be process model;
storing, by the computer system, a second plurality of process instances that were recorded according to the adjusted to-be process model;
generating, by the computer system, an adjusted as-is model from the second plurality of process instances;
calculating, by the computer system, an adjusted sequence-based compliance measurement between the adopted reference model and the adjusted as-is model; and
comparing the adjusted sequence-based compliance measurement with the sequence-based compliance measurement, to determine whether the adjusted to-be process model resulted in an improvement of the business process.

4. The computer-implemented method of claim 1, where calculating the sequence-based compliance measurement comprises:
calculating a firing sequence compliance degree (fscd) of the as-is model with respect to the adopted reference model according to a second equation:

$$fscd(\sigma_2, \sigma_1, \mathcal{P}, \mathcal{G}) = \frac{fsc(\sigma_2, \sigma_1, \mathcal{P}, \mathcal{G})}{|\sigma_1|_{map}}$$

wherein the second firing sequence $\sigma_2$ includes transitions, and wherein the firing sequence compliance degree evaluates how many of the transitions of the second firing sequence $\sigma_2$ are present in the first firing sequence $\sigma_1$ while preserving an activity order.

5. The computer-implemented method of claim 4, where calculating the sequence-based compliance measurement comprises:
calculating a compliance degree (cd) of the as-is model with respect to the adopted reference model according to a third equation:

$$cd(M_2, M_1, \mathcal{P}, \mathcal{G}) = \frac{\sum_{\sigma_2 \in S'(M_2)} \max_{\sigma_1 \in S'(M_1)} \{fscd(\sigma_2, \sigma_1, \mathcal{P}, \mathcal{G})\}}{|S'(M_2)|}$$

wherein the compliance degree indicates how many instances of the second reference model $M_2$ are also present in the first reference model $M_1$.

6. The computer-implemented method of claim 1, where calculating the sequence-based compliance measurement comprises:
calculating a firing sequence compliance maturity (fscm) of the as-is model with respect to the adopted reference model according to a second equation:

$$fscm(\sigma_2, \sigma_1, \mathcal{P}, \mathcal{G}) = \frac{fsc(\sigma_2, \sigma_1, \mathcal{P}, \mathcal{G})}{|\sigma_1|_{ext}}$$

wherein the first firing sequence $\sigma_1$ includes transitions, and wherein the firing sequence compliance maturity evaluates how many of the transitions of the first firing sequence $\sigma_1$ are present in the second firing sequence $\sigma_2$ while preserving an activity order.

7. The computer-implemented method of claim 6, where calculating the sequence-based compliance measurement comprises:
calculating a compliance maturity (cm) of the as-is model with respect to the adopted reference model according to a third equation:

$$cm(M_2, M_1, \mathcal{P}, \mathcal{G}) = \frac{\sum_{\sigma_1 \in S'(M_1)} \max_{\sigma_2 \in S'(M_2)} \{fscm(\sigma_2, \sigma_1, \mathcal{P}, \mathcal{G})\}}{|S'(M_1)|}$$

wherein the compliance maturity indicates how many of the instances of the first reference model $M_1$ are being followed by the second reference model $M_2$.

8. The computer-implemented method of claim 1, wherein the method further comprises:
adjusting a to-be model according to a granularity related to the adopted reference model.

9. The computer-implemented method of claim 1, wherein the method further comprises:
adjusting the as-is model according to an order partition related to the adopted reference model.

10. The computer-implemented method of claim 1, wherein the method further comprises:
adjusting the adopted reference model according to an exclusion partition related to the adopted reference model.

11. The computer-implemented method of claim 1, wherein the method further comprises:
adjusting the adopted reference model according to a cycle related to the adopted reference model.

12. A non-transitory computer-readable medium embodying a computer program that controls a computer system to measure process compliance, comprising:
a storage module that controls the computer system to store an adopted reference model of a business process, and that controls the computer system to store a plurality of process instances of the business process;
a generation module that controls the computer system to generate an as-is model from the plurality of process instances;
a calculation module that controls the computer system to calculate a sequence-based compliance measurement between the adopted reference model and the as-is model; and
an output module that controls the computer system to output the sequence-based compliance measurement,
wherein calculating the sequence-based compliance measurement comprises:
calculating a compliance degree between the adopted reference model and the as-is model,
calculating a compliance maturity between the adopted reference model and the as-is model, and
calculating a firing sequence compliance (fsc) of the as-is model with respect to the adopted reference model according to an equation:

$$fsc(\sigma_2, \sigma_1, P, G) = \max\{lcs(s, s') \mid s \in \sigma_1^{ext}(P), s' \in \sigma_2^{map}(G)\}$$

wherein the firing sequence compliance selects a variation having a maximum similarity between a first firing sequence $\sigma_1$ and a second firing sequence $\sigma_2$,
wherein P is a set of user-selected partitions related to a first reference model $M_1$, G is a granularity mapping between $M_1$ and a second reference model $M_2$, lcs calculates a length of a longest common subsequence of two firing sequences, s is the length of a common subsequence of $\sigma_1$, and s' is the length of the common subsequence $\sigma_2$.

13. The non-transitory computer-readable medium of claim 12, further comprising:
an identifying module that controls the computer system to identify a process instance of the plurality of process instances that negatively impacts the sequence-based compliance measurement.

14. The non-transitory computer-readable medium of claim 12, further comprising:
an adjusting module that controls the computer system to adjust a to-be model according to a granularity related to the adopted reference model.

15. The non-transitory computer-readable medium of claim 12, further comprising:
an adjusting module that controls the computer system to adjust the as-is model according to an order partition related to the adopted reference model.

16. A computer system for measuring process compliance, comprising:
a storage system that is configured to store an adopted reference model of a business process, and that is configured to store a plurality of process instances of the business process;
a generation module that is configured to generate an as-is model from a plurality of process instances;
a calculation module that is configured to calculate a sequence-based compliance measurement between the adopted reference model and the as-is model; and
an interface module that is configured to output the sequence-based compliance measurement,
wherein calculating the sequence-based compliance measurement comprises:
calculating a compliance degree between the adopted reference model and the as-is model,
calculating a compliance maturity between the adopted reference model and the as-is model, and
calculating a firing sequence compliance (fsc) of the as-is model with respect to the adopted reference model according to an equation:

$$fsc(\sigma_2, \sigma_1, P, G) = \max\{lcs(s, s') \mid s \in \sigma_1^{ext}(P), s' \in \sigma_2^{map}(G)\}$$

wherein the firing sequence compliance selects a variation having a maximum similarity between a first firing sequence $\sigma_1$ and a second firing sequence $\sigma_2$,
wherein P is a set of user-selected partitions related to a first reference model $M_1$, G is a granularity mapping between $M_1$ and a second reference model $M_2$, lcs calculates a length of a longest common subsequence of two firing sequences, s is the length of a common subsequence of $\sigma_1$, and s' is the length of the common subsequence $\sigma_2$.

17. The computer system of claim 16, further comprising:
a plurality of client computers that record the plurality of process instances.

18. The computer system of claim 16, further comprising:
an identifying module that is configured to identify a process instance of the plurality of process instances that negatively impacts the sequence-based compliance measurement.

19. The computer system of claim 16, further comprising:
an adjusting module that is configured to adjust a to-be model according to a granularity related to the adopted reference model.

20. The computer system of claim 16, further comprising:
an adjusting module that is configured to adjust the as-is model according to an order partition related to the adopted reference model.

* * * * *